United States Patent [19]

Gallay et al.

[11] Patent Number: 4,970,675
[45] Date of Patent: Nov. 13, 1990

[54] MULTIPLIER FOR BINARY NUMBERS COMPRISING A VERY HIGH NUMBER OF BITS

[75] Inventors: Philippe Gallay, Brignoud; Eric Depret, Caen, both of France

[73] Assignee: Etat Francais représenté par le Ministre des Postes, Issy-Les Moulineaux, France

[21] Appl. No.: 310,172

[22] Filed: Feb. 15, 1989

[30] Foreign Application Priority Data

Feb. 15, 1988 [FR] France ................................ 88 02096

[51] Int. Cl.$^5$ ............................................... G06F 7/52
[52] U.S. Cl. .................................................... 364/757
[58] Field of Search ................ 364/757, 754, 786, 736

[56] References Cited

U.S. PATENT DOCUMENTS 3,098,153 7/1963 Heijn .................................. 364/786

FOREIGN PATENT DOCUMENTS 59-35236 2/1984 Japan .

OTHER PUBLICATIONS

L. De Vos et al., "A Fast Adder-Based Multiplication Unit For Customised Digital Signal Processors" ICASSP 86, Tokyo (Apr. 1986): 2163–2166.

Primary Examiner—Gary V. Harkcom
Assistant Examiner—Tan V. Mai
Attorney, Agent, or Firm—Lowe, Price, Leblanc, Becker & Shur

[57] ABSTRACT

A multiplier for two binary values, X and Y, comprising a very high number (q) of bits, wherein memories storing the numbers X and Y and a result register MR are provided, X being expressed as the sequence of bits ($x_{q-1} \ldots x_j \ldots x_0$), uses the algorithm consisting in sequentially carrying out from $j=q-1$ to $j=0$ the additions $2R + x_j Y$ and each time entering the result in the result memory (MR). In this multiplier the adders are grouped into n blocks of m bits (with $n \times m = q$), m being chosen so that the carry transfer time into a block is lower than a clock period. Each block comprises a first and a second line of elementary adders forming the cells ($C_1$ to $C_{m+1}$) associated with each pair of bits to be added. This multiplier is more particularly adapted for carrying out the operations $XY \bmod N$ and $X^S \bmod N$.

3 Claims, 2 Drawing Sheets

MULTIPLIER FOR BINARY NUMBERS COMPRISING A VERY HIGH NUMBER OF BITS

BACKGROUND OF THE INVENTION

The instant invention relates to digital calculation devices and more particularly to a multiplier permitting to multiply binary numbers comprising a very high number of bits.

Various types of multipliers are known in the art, but they are usually adapted to multiply numbers comprising 4, 8, 16 or 32 bits. If one tries to use such multipliers for carrying out calculations of binary numbers, comprising for example 256, 512 or 1024 bits, a very long calculation time is necessary.

Thus, an object of the instant invention is to provide for a multiplier permitting to rapidly multiply binary numbers with a very high value, this multiplier having a high speed.

Another object of the instant invention is to provide for such a multiplier that can be integrated on one single chip comprising about 100,000 elementary components, that is, a size compatible with the present technologies.

SUMMARY OF THE INVENTION

In order to achieve this purpose, the instant invention provides for a multiplier multiplying two binary values, X and Y, having a very high number (q) of bits wherein memories storing the numbers X and Y and a result register are provided, X being expressed as the bit sequence $(x_{q-1} \ldots x_j \ldots x_0)$, this multiplier using the algorithm consisting in sequentially carrying out from $j=q-1$ to $j=0$ the additions $2R+x_jY$ and each time entering the result in the result register. In this multiplier, the adders are grouped into n blocks of m bits (with $n \times m = 2q$), m being chosen so that the carry transfer time in a block is lower than a clock period, so that:

- each block comprises a first and a second line of elementary adders forming the cells associated with each pair of bits to be added,
- the elementary adders of the first line are full adders, the two inputs of which receive the bits to be added and the third input of which receives the carry bit of the preceding cell,
- the first cell of a block, that is, the least significant cell, only comprises one adder of the first line, the low weight output of which constitutes a block output,
- the second and fourth to $m^{th}$ cells comprise a full adder in the first line and a half-adder in the second line, the latter receiving the least significant output from the first line adder of the same cell and a low order carry bit of the preceding block from the preceding second line adder,
- the third cell comprises in the second line a full adder liable to receive in addition to the hereinabove mentioned accesses the output of the high order carry bit of the preceding block.
- the $(m+1)^{th}$ cell of each block comprises a half-adder receiving the carry bits from the two adders of the $m^{th}$ cell and supplying their sum to two memory points which store the carries of the related block,
- the outputs of each block are sent to the result register, in parallel.

An advantage of the arrangement according to the instant invention is that each group of elementary additions inside each block can be carried out within one clock period. It is simply necessary at the end of the operation to make the carry transfers during a number of clock periods equal to the number n of blocks for completing the calculation, which is far shorter than making the carry transfer for each elementary calculation since the latter are much more numerous than the number of blocks.

It will be understood from the following description that the multiplier according to the instant invention is liable to be used for many other purposes than those of calculation of a simple multiplication since numerous operations, for example exponential calculations, may be reduced to successive multiplications.

It will be further understood that this multiplier is liable to be used in the implementation of a device also realizable on one chip for forming a data coder-decoder permitting to transmit data between terminals while preventing a fraudulent decoding.

BRIEF DESCRIPTION OF THE DRAWINGS

Those objects, features, advantages and others of the instant invention will clearly appear from the following detailed description of preferred embodiments, in connection with the attached drawings, wherein.

DETAILED DESCRIPTION OF THE DRAWINGS

Let X and Y be two numbers that can be expressed in the form of a sequence of q binary elements, $(x_{q-1} \ldots x_j \ldots x_0)$ and $(y_{q-1} \ldots y_j \ldots y_0)$, one chooses for multiplying them the algorithm consisting, for each value $x_j$, in carrying out the operation sequence $2R+x_jY$ where j corresponds to the successive values ranging from $q-1$ to 0. After each operation, the result is entered into a register MR which initially contains the value 0 and the content of the register MR is used again for the following operation. With this algorithm, a multiplication is decomposed into q operations, each of which comprises a left-hand shifting of the register content R in order to obtain 2R and an addition of this value 2R to Y if $x_j=1$ or to 0 if $x_j=0$.

Figure 1:
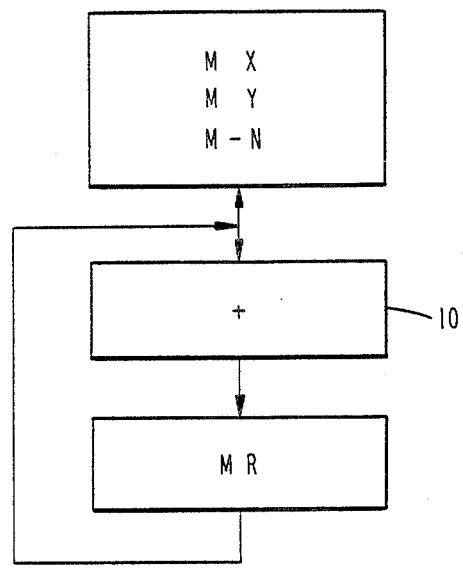
FIG. 1 schematically shows a prior art multiplier.

FIG. 1 very schematically shows a structure permitting to carry out this calculation. Let MX and MY be registers contained in a memory, the content of this memory is moved into an adder 10 where the content of the register MY is added to 2R. The output of the adder is moved into the register MR where all the intermediate values of the result R are successively stored and replaced by the following value. The output of the register MR shifted of one unit for supplying 2R is entered into the second input of the adders of block 10.

In a general way, the calculation system of the type shown in FIG. 1 is controlled by a clock, for example a clock having a period of 100 ns. The adder 10 is constituted by elementary adders respectively adding two or three input bits for supplying two output bits: 1 low order bit and 1 carry bit. The carry transfer of an adder to the following is more rapidly carried out than the clock frequency, for example in 4 ns in the conventional technologies. In order to carry out an addition, the carry bit has to be propagated from the least significant cell of the adder to the most significant cell. On the other hand, in practice, the computer calculation systems are based on sets, the number of cells of which is a multiple of 2, for example 2, 4, 8, 16, 32, etc. With the abovementioned digital values, it can be noted that only 16-bit operations can be carried out within one clock period (4 ns×16=64 ns, lower than 100 ns). Thus, if it is desired, for example, to carry out additions on operands comprising 32 bits, the carrying out of the addition will necessitate two clock cycles. For operands with 256 bits, 256/16=16 clock periods would then be necessary for carrying out each elementary addition, which, as regards the preceding algorithm, would require a total time period of 16×256 clock periods since the calculation is repeated for each of the bits of number X. Thus, the multiplication of two operands comprising 256 bits will require 256×16×100 ns, that is, about 0.4 ms.

Figure 2:
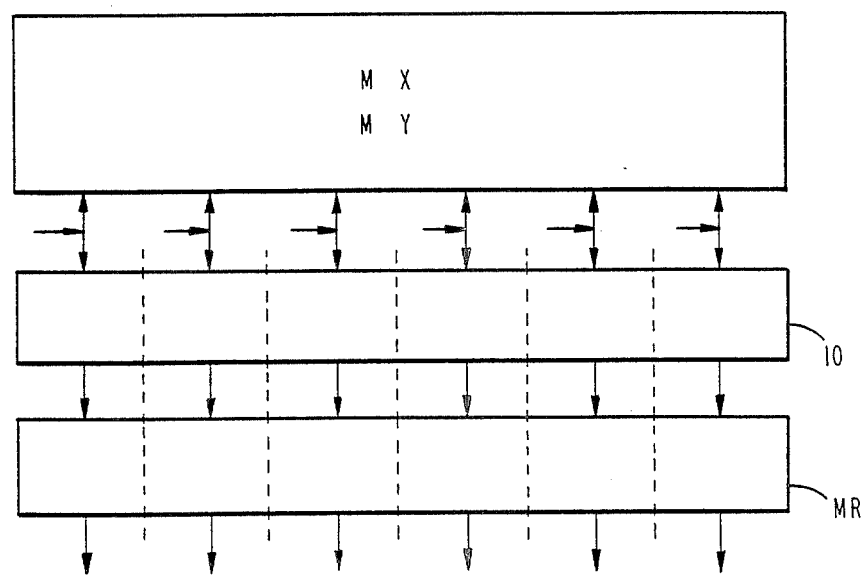
FIG. 2 very schematically shows the architecture of the multiplier according to the instant invention.

The object of the instant invention is to use a calculator architecture permitting to substantially reduce this calculation time. For this purpose, the adders are divided into n blocks of m bits, with n×m=q, for example as schematically shown in FIG. 2. The number n of bits of each of the blocks is chosen so that the carry transfer time inside one block is lower than the duration of a clock period. Thus, within one clock period, each block supplies a calculation result and transmits same into the associated register MR. For the proper operation of the system, the carry supplied at each block has to be stored and transferred during the following clock pulse. At the end of the processing, a number of transfers equal to the number n of blocks will have to be achieved in order to obtain the final result.

Therefore, for words comprising 128 bits, only 128 initial operations having a duration of one clock period will have to be carried out, followed by 16 operations (16 blocks) for the carry transfers. A factor practically equal to 16 with respect to the processing duration of the base system illustrated in FIG. 1 (128+16 operations instead of 128×16) is thus obtained.

The instant invention more particularly aims at realizing an adder 10 for implementing the abovementioned function. The architecture of an adder block 10 is shown in more detail in FIG. 3. The block is constituted by elementary adder cells $C_1$ to $C_{m+1}$. The adders are distributed among 2 lines, a first line comprising the adders $A_{11}$ to $A_{m1}$ and a second line comprising the adders $A_{12}$ to $A_{m2}$. All the adders of the first line are full adders, that is, adders with 3 inputs and 2 outputs. The adders of the second line are half-adders, that is, adders with 2 inputs and 2 outputs, except for the adder $A_{22}$ which is a full adder.

The first cell $C_1$ comprises the adder $A_{11}$, the second cell comprises the adder $A_{21}$ and the adder $A_{12}$, the $m^{th}$ cell comprises the adder $A_{m1}$ and the adder $A_{m-1,2}$, and the $(m+1)^{th}$ cell comprises the adder $A_{m2}$.

In the cells $C_4$ to $C_{m-1}$, each first line adder receives on its first two inputs the appropriate weight bits to be added and on its third input the output of the preceding adder, and sends its high order output bit to the following cell and its lower order output bit to the second line adder of the same cell. This second adder sends its low order bit to the corresponding output towards the register MR, and its high order bit to the following adder of the second line.

Figure 3:
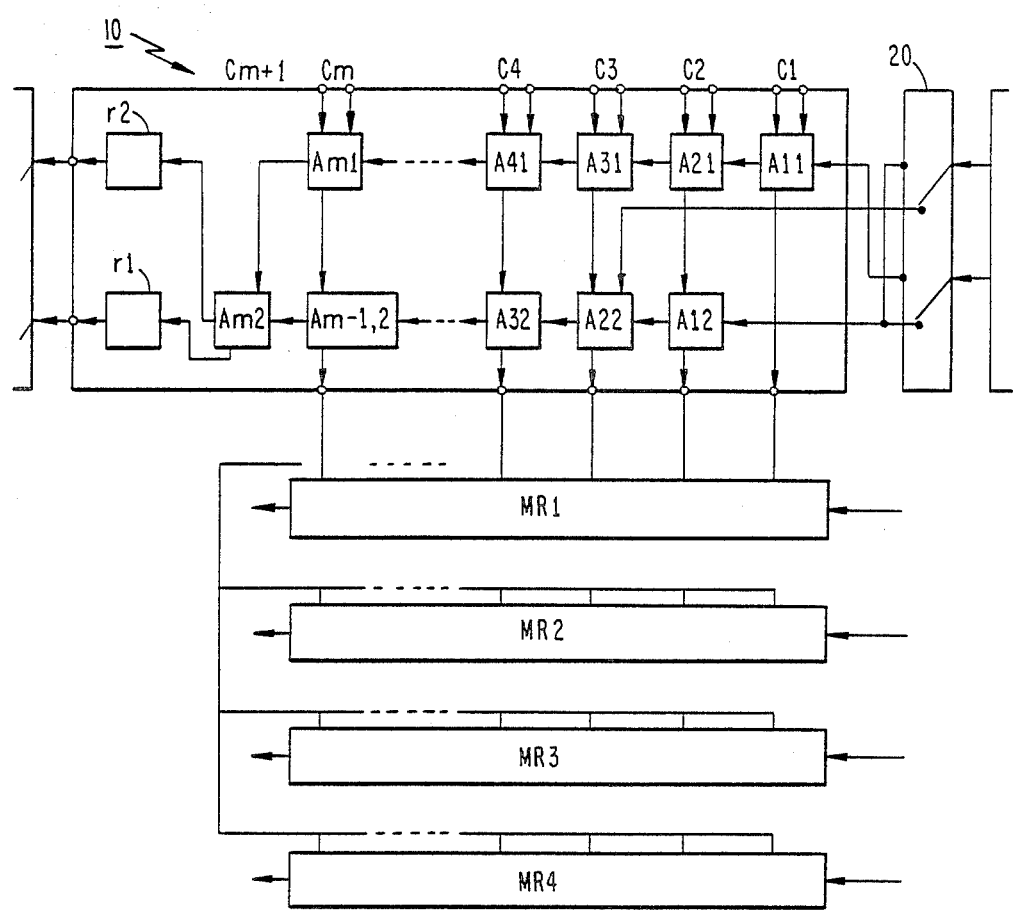
FIG. 3 shows in more detail an adder block according to the instant invention.

It is advisable to more particularly consider the connection of the initial and final cells which, in relation with FIG. 3, are specifically connected for carrying out the calculation $2R+x_jY$ while taking into account the carry of the preceding block.

The adder $A_{11}$ of the cell $C_1$ has its third input nonconnected. For this only application, a half-adder could be used, but as it will be seen later, it is more advisable to provide for a full adder in order to permit carrying out operations other than the specific operation $2R+x_jY$.

Cell $C_2$ is identical to cells $C_4$ to $C_{m-1}$, the adder $A_{12}$ receiving the low order bit of the carry stored by the preceding block during the previous cycle.

In cell $C_3$, the adder $A_{22}$ is a full adder which receives the output of the low order bit of the adder $A_{31}$, the output of the high order bit of the adder $A_{12}$, and the output of the high order bit stored by the preceding block during the previous cycle.

In cell $C_m$, both adders $A_{m1}$ and $A_{m-1,2}$ supply their high order bit to the adder $A_{m2}$ of the cell $C_{m+1}$, that is, their carry bits which are summed by the adder $A_{m2}$, the result being stored in the memory points r1 and r2 (r1 and r2 constituting a two-bit register). The register outputs r1-r2 of the preceding block are respectively sent to the adders $A_{12}$ and $A_{22}$ of the second line of the related block.

As hereinabove described, the least significant outputs of cells $C_1$ to $C_m$ are supplied to a result register MR1.

FIG. 3 shows four result registers MR1 to MR4. This is another specific aspect of the architecture according to the instant invention. Indeed, as it will be seen later, if it is not desired to have more than about 100,000 elementary components on a single chip, it is difficult to develop adder devices comprising over 256 bits. The problem is solved, according to one aspect of the instant invention, when it is desired to carry out operations on operands comprising over 128 bits, for example 256 or 512 bits, by acting separately upon the low and high order bits of those operands. As regards operands comprising 256 bits, one will sequentially proceed by supplying the outputs of the adders once in the register MR1 and once in the register MR2. For 512 bits, one will sequentially proceed in four steps. Thus, according to this aspect of the invention, the same chip is liable to supply operations on operands comprising a high number of bits but with three different orders of magnitude (those orders of magnitude being defined in the binary system).

As an example of more complex operations that can be carried out by an operator according to the instant invention, this operator is liable to be used, practically without any modification, for carrying out the operation XYmodN instead of the simple multiplication XY. For this purpose, one simply has to add to the above algorithm the process consisting in analyzing, after each elementary operation, the carry bit of the highest order block. If this bit is equal to 1, one has to insert the process consisting in entering the value R-N into the register R as many times as necessary. For this purpose, the binary value −N is stored in the memory which already contains the registers MX and MY in the form of a register M(−N) and one uses the adder 10 for carrying out the operation R+(−N) when advisable. When this operation is carried out, it is essential to modify the process of the carry transfer from one block to another, the hereinabove mentioned transfer being correlated with the fact that the value 2R was added to Y, that is, the value R shifted of one bit on the left. For the case a simple operation R+(−N) is carried out, no initial shifting is to be made and one introduces the carry bits of a preceding block into the following block, directly towards the adders $A_{11}$ and $A_{12}$ of this block, the adder $A_{11}$ receiving the low order carry bit and the adder $A_{12}$, the high order carry bit. For this purpose a switch, referenced 20 in FIG. 3, will be provided for. This figure shows the switch in the position corresponding to the operation $2R+Y$. It will be switched to the other position for the operation $R+(-N)$.

As regards the storage of the value $-N$, one will proceed as it is conventional in the two's complement binary calculation by storing the binary number, each bit of which has been completed with respect to the number N with the addition of one unit.

It will be noted that the instant invention is particularly advantageous in case of these modulo multiplications. Indeed, in that case the result will comprise the same number of bits as the operands, X, Y and N. Therefore, the blocks will then be such as $m \times n = q$ instead of 2q, that is, as regards the abovementioned examples, one will carry out operations on operands with 256, 512 and 1024 bits and no longer with 128, 256 and 512 bits.

Of course, the hereinabove description is intended for those skilled in the art of computers and numerous practical implementation details have not be described. More particularly, it will be evident to those skilled in the art that clock inputs, sequencers, addressing systems, a shifting register, etc. have to be provided for obtaining the value R or the value 2 R.

It has hereinabove been disclosed how the operator according to the instant invention could be used for carrying out the operations XY or XYmodN. Of course, said operator is also liable to be used for carrying out more complex operations, the resolution algorithms of which comprise the carrying out of the hereinabove-mentioned operations. For example, if it is desired to calculate the expression $Y = X^S \mathrm{mod} N$, expressing S as being $(s_{k-1} \ldots s_i \ldots s_0)$, the algorithm consists, from an initial value of Y, in carrying out, for each of the values of i ranging from $k-1$ to 0, the operation $Y = Y^2 \mathrm{mod} N$ if $s_i = 0$ and the operations $Y = Y^2 \mathrm{mod} N$ and $Y = YX \mathrm{mod} N$ if $s_i = 1$. It can be seen that those operations are very easy to carry out with the operator according to the instant invention. It will be noted that the operation $Y = X^S \mathrm{mod} N$ is a type of operation that is often used in the data coding systems designed to avoid a fraudulent decoding.

As an example of the results obtained with a device according to the instant invention, it will be noted that the inventors have manufactured an operator permitting to carry out the abovementioned calculation ($Y = X^S \mathrm{mod} N$) in the 2-microns CMOS technology comprising 100,400 transistors integrated in a 88 mm² chip. The operation XYmodN was carried out in 0.3 ms in case the operands Y, X and N were words of 512 bits. The operation $X^S \mathrm{mod} N$ was carried out in 70 ms, 320 ms and 1.5 s in case X, S and N were words of 256, 512 and 1024 bits, respectively. In case X and N were words of 1024 bits and S was equal to 3, the operation was carried out in 3 ms, that is, at a transmission speed higher than 256 kilobits per second. In case S was equal to 2 and X and N were words of 1024 bits, the operation $X^2 \mathrm{mod} N$ has been carried out in 1.65 ms, that is, at a transmission speed higher than 512 kilobits per second.

We claim:

1. A multiplier for two binary values, X and Y, comprising a very large number (q) of bits, wherein memories (MX and MY) storing the numbers X and Y and a result register (MR) are provided, X being expressed as a sequence of bits (xhd q$-1 \ldots x_j \ldots x_0$), said multiplier using the algorithm consisting in sequentially carrying out from $j = q-1$ to $j = 0$ the additions $2R + x_j Y$ and each time entering the result in said result register (MR), wherein:

the adders are grouped into n blocks of m bits (with $n \times m = q$), m being chosen so that the carry transfer time into a block is shorter than a clock period, each block comprises a first and a second line of elementary adders forming $m+1$ cells ($C_1$ to $C_{m+1}$) associated with each pair of bits to be added, each block being connected to the following one through two one-bit memory cells, the elementary adders ($A_{11}$ to $A_{m1}$) of the first line are full adders, two inputs of which receive the bits to be added, the third input of the 2nd to mth ($A_{21}$-$A_{m1}$) of which receives the carry bit of the preceding cell, and the third input of the first ($A_{11}$) of which receives the output of one of said memory cells of the former block, the first cell ($C_1$) of a block, that is, the least significant cell, only comprises a first line adder ($A_{11}$), the low order output bit of which constitutes a block output, the second cell ($C_2$) comprise a full adder ($A_{21}$) in the first line and a half adder ($A_{12}$) in the second line, said half adder receiving the low order output bit of the full adder of the same cell and the output of the other of said memory cells of the former block, the third cell ($C_3$) comprises a full adder in the first line and a full adder ($A_{22}$) in the second line, said second line full adder receiving the low order bit of the first line adder of the same cell, the carry bit from the preceding second line adder and possibly the output of said one of said memory cells of the former block, the fourth ($C_4$) to $m^{th}$ ($C_m$) cells comprise a full adder in the first line and a half-adder in the second line, said half adder receiving the low order output bit of the first line adder of the same cell and the carry bit of the preceding second line adder, the $(m+1)^{th}$ cell of each block comprises a half-adder receiving the carry bits of the two adders of the $m^{th}$ cell and supplying the two bits of their sum to said two one-bit memory cells, the outputs of each block are sent to the result register, in parallel.

2. A multiplier according to claim 1 adapted to the multiplication of binary numbers ranging from q to pq bits, comprising p result registers (MR1–MR4) sequentially loaded by the abovementioned blocks.

3. A multiplier according to claim 1, further permitting to carry out the operation XYmodN, wherein, between each elementary operation $2R + x_j Y$, the overflow bit ($r_{ov}$) of the most significant block is checked and, if said overflow bit is equal to 1, the operation $R - N$ is inserted as many times as necessary, further comprising:

a ($-N$) memory register, switching means between each block for applying the low and high order carry bits stored in the memory cells of one block, respectively, to the first adders of the first and second lines of the following block, to carry out the operation $R + (-N)$.

* * * * *